United States Patent
Zha et al.

(10) Patent No.: US 10,365,023 B2
(45) Date of Patent: Jul. 30, 2019

(54) REFRIGERATION SYSTEM WITH INTEGRATED AIR CONDITIONING BY PARALLEL SOLENOID VALVES AND CHECK VALVE

(71) Applicant: Heatcraft Refrigeration Products LLC, Stone Mountain, GA (US)

(72) Inventors: Shitong Zha, Snellville, GA (US); Augusto Zimmermann, Lilburn, GA (US)

(73) Assignee: Heatcraft Refrigeration Products LLC, Stone Mountain, GA (US)

( * ) Notice: Subject to any disclaimer, the term of this patent is extended or adjusted under 35 U.S.C. 154(b) by 0 days.

(21) Appl. No.: 15/696,755

(22) Filed: Sep. 6, 2017

(65) Prior Publication Data

US 2019/0072305 A1 Mar. 7, 2019

(51) Int. Cl.
F25B 41/04 (2006.01)
F25B 49/02 (2006.01)

(52) U.S. Cl.
CPC .............. *F25B 41/04* (2013.01); *F25B 49/02* (2013.01); *F25B 2600/2525* (2013.01)

(58) Field of Classification Search
CPC .......... F25B 9/008; F25B 41/04; F25B 49/02; F25B 2309/06; F25B 2400/13; F25B 2400/16; F25B 2400/23; F25B 2600/2511; F25B 2600/2515; F25B 2600/2525
See application file for complete search history.

(56) References Cited

U.S. PATENT DOCUMENTS

| | | | |
|---|---|---|---|
| 5,655,379 A | * | 8/1997 | Jaster .................... F25B 41/065 137/392 |
| 2010/0147006 A1 | * | 6/2010 | Taras ........................ F25B 7/00 62/335 |

(Continued)

FOREIGN PATENT DOCUMENTS

DE 102015112439 A1 2/2017

OTHER PUBLICATIONS

Fardis Najafifard et al., U.S. Appl. No. 15/696,450, titled, "Refrigeration System with Integrated Air Conditioning by a High Pressure Expansion Valve," filed Sep. 6, 2017, pp. 38.

(Continued)

*Primary Examiner* — Marc E Norman
(74) *Attorney, Agent, or Firm* — Baker Botts L.L.P.

(57) ABSTRACT

A system includes a heat exchanger coupled to an air conditioning system, and a flash tank is coupled to refrigeration cases, and houses a first refrigerant. The system includes solenoid valves coupled to the flash tank, where the solenoid valves reduce a pressure of the first refrigerant flowing from the flash tank to the heat exchanger. The heat exchanger may be coupled to the solenoid valves, and the heat exchanger may be configured to receive an amount of the first refrigerant from the solenoid valves, receive a second refrigerant from the air conditioning system, where the second refrigerant is associated with an air conditioning load, and provide cooling to the second refrigerant, using the first refrigerant. Finally, the system includes a check valve coupled to the flash tank, where the check valve reduces a pressure of the first refrigerant flowing from the flash tank away from the solenoid valves.

18 Claims, 5 Drawing Sheets

(56) References Cited

U.S. PATENT DOCUMENTS

| | | |
|---|---|---|
| 2014/0151015 A1* | 6/2014 | Sun .......................... F25B 1/10 165/253 |
| 2014/0208785 A1 | 7/2014 | Wallace et al. |
| 2017/0205120 A1 | 7/2017 | Ali et al. |

OTHER PUBLICATIONS

European Patent Office, Extended European Search Report, Application No. 18189333.0, dated May 29, 2019, 9 pages.

* cited by examiner

REFRIGERATION SYSTEM WITH INTEGRATED AIR CONDITIONING BY PARALLEL SOLENOID VALVES AND CHECK VALVE

TECHNICAL FIELD

This disclosure relates generally to a refrigeration system. More specifically, this disclosure relates to a refrigeration system with integrated air conditioning by parallel solenoid valves and check valve.

BACKGROUND

Refrigeration systems can be used to regulate the environment within an enclosed space. Various types of refrigeration systems, such as residential and commercial, may be used to maintain cold temperatures within an enclosed space such as a refrigerated case. To maintain cold temperatures within refrigerated cases, refrigeration systems control the temperature and pressure of refrigerant as it moves through the refrigeration system.

SUMMARY

In certain embodiments, a system includes a first heat exchanger coupled to an air conditioning system, and a flash tank coupled to one or more refrigeration cases, where the flash tank is configured to house a first refrigerant. The system may further include one or more solenoid valves coupled to the flash tank, where the one or more solenoid valves are configured to reduce a pressure of the first refrigerant flowing from the flash tank to the first heat exchanger. The first heat exchanger may be coupled to the one or more solenoid valves, and the first heat exchanger may be configured to receive an amount of the first liquid refrigerant from the one or more solenoid valves, receive a second refrigerant from the air conditioning system, where the second refrigerant is associated with an air conditioning load, and provide cooling to the second refrigerant, using the first refrigerant. Finally, the system may include a check valve coupled to the flash tank, where the check valve configured to reduce a pressure of the first vapor refrigerant flowing from the flash tank away from the one or more solenoid valves.

In certain embodiments, a method of configuring a system includes coupling a flash tank to one or more refrigeration cases, where the flash tank configured to house a first refrigerant. The method may further include coupling one or more solenoid valves to the flash tank and coupling a first heat exchanger to the one or more solenoid valves. The one or more solenoid valves may be configured to reduce a pressure of the first liquid refrigerant flowing from the flash tank to the first heat exchanger. The first heat exchanger may be configured to receive an amount of the first refrigerant from the one or more solenoid valves, receive a second refrigerant from the air conditioning system, the second refrigerant associated with an air conditioning load, and provide cooling to the second refrigerant, using the first refrigerant. Finally, the method may include coupling a check valve to the flash tank, where the check valve is configured to reduce a pressure of the first vapor refrigerant flowing from the flash tank away from the one or more solenoid valves.

In some embodiments, a system may include one or more solenoid valves and a first heat exchanger coupled to the one or more solenoid valves. The one or more solenoid valves may be configured to reduce a pressure of a first liquid refrigerant flowing to a first heat exchanger. The system may further include a temperature probe coupled to a refrigerant line exiting the first heat exchanger, where the temperature probe is configured to determine the temperature of the first refrigerant in the refrigerant line exiting the first heat exchanger. The system may also include a controller coupled to the temperature probe and the one or more solenoid valves, the controller configured to determine a temperature of the first refrigerant in the refrigerant line exiting the heat exchanger. The controller may be further configured to, based on the temperature of the first refrigerant in the refrigerant line exiting the heat exchanger, determine a number of the one or more solenoid valves to open, and instruct the number of the one or more solenoid valves to open. The heat exchanger may be configured to receive an amount of the first refrigerant from the one or more solenoid valves, receive a second refrigerant from the air conditioning system, the second refrigerant associated with an air conditioning load, and provide cooling to the second refrigerant, using the first refrigerant.

BRIEF DESCRIPTION OF THE DRAWINGS

For a more complete understanding of the present disclosure, reference is now made to the following description, taken in conjunction with the accompanying drawings, in which.

DETAILED DESCRIPTION

Cooling systems may cycle a refrigerant to cool various spaces. For example, a refrigeration system may cycle refrigerant to cool spaces near or around refrigeration loads. In certain installations, such as at a grocery store for example, a refrigeration system may include different types of loads. For example, a grocery store may use medium temperature loads and low temperature loads. The medium temperature loads may be used for produce and the low temperature loads may be used for frozen foods. Cooling the refrigeration load causes the refrigerant to expand and to increase in temperature. The refrigeration system compresses and cools the refrigerant discharged from the refrigeration load so that cool liquid refrigerant can be recirculated through the refrigeration system to keep the refrigeration load cool.

To compress the refrigerant, the refrigeration system includes one or more compressors. Examples of compressors include one or more LT compressors configured to compress refrigerant from the LT case and an MT compressor configured to compress refrigerant from the MT case. The compressors may also include one or more parallel compressors. Generally, a parallel compressor operates "in parallel" to another compressor (such as an MT compressor) of the refrigeration system, thereby reducing the amount of compression that the other compressor needs to apply. This may lower the energy consumed by a refrigeration system.

In a conventional transcritical booster refrigeration system, such as a carbon dioxide ($CO_2$) transcritical booster refrigeration system, the refrigerant works to cool various loads in the LT case and the MT case, while there may be a separate air conditioning system to cool any surrounding areas. For example, in a grocery store, the produce and frozen foods may be cooled using a transcritical booster refrigeration system, while the rest of the store (e.g., the aisle, registers, etc.) are cooled to a lesser extent by an air conditioning system. This requires additional components and energy to cool the refrigerant of both the air conditioning system and the refrigeration system separately. Thus, there is a desire for a system that may integrate the refrigeration system and air conditioning system, specifically using a heat exchanger to cool the refrigerant from the air conditioning system with the refrigerant from the refrigeration system.

Embodiments of the present disclosure and its advantages are best understood by referring to FIGS. 1 through 5 of the drawings, like numerals being used for like and corresponding parts of the various drawings.

Figure 1:
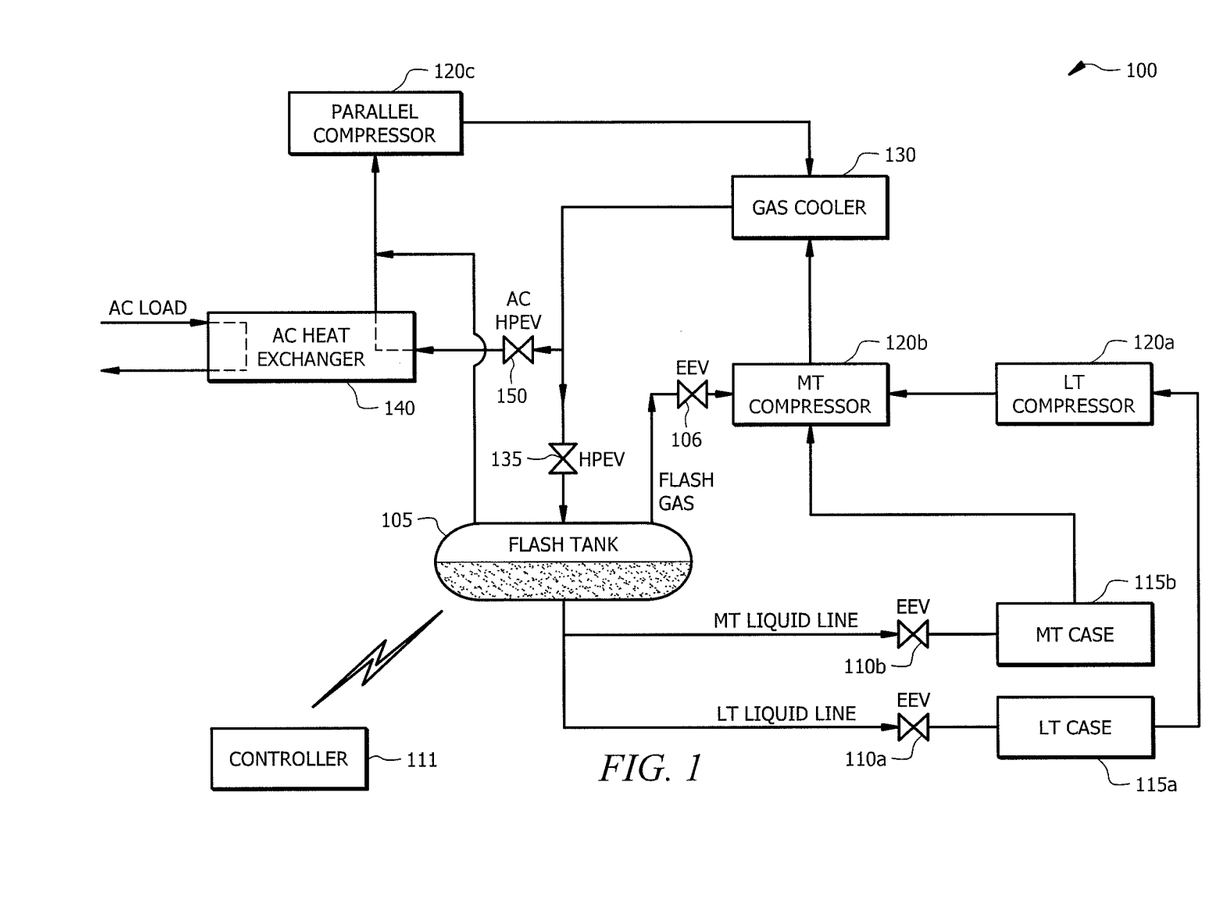
FIG. 1 is a block diagram illustrating an example refrigeration system, according to some embodiments.
Figure 2:
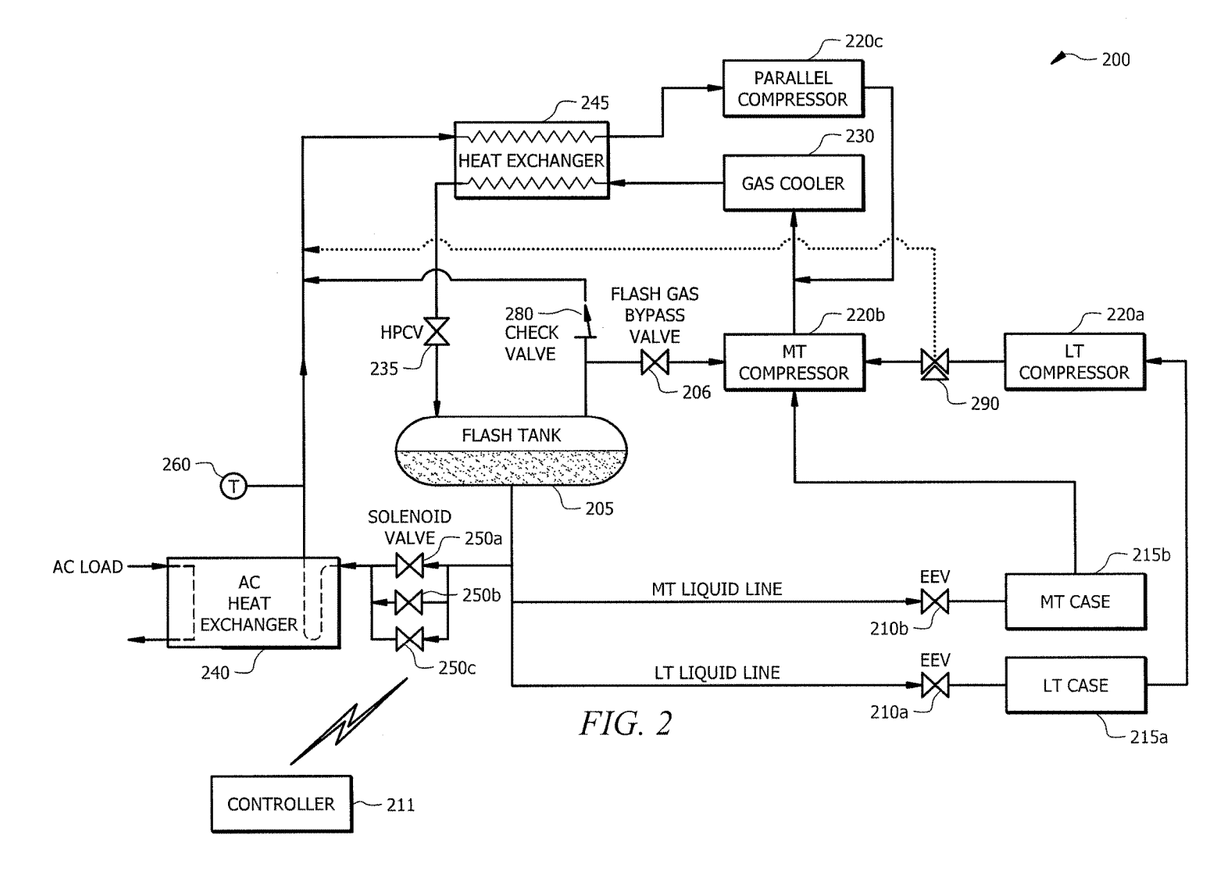
FIG. 2 is a block diagram illustrating an example refrigeration system, according to some embodiments.
Figure 3:
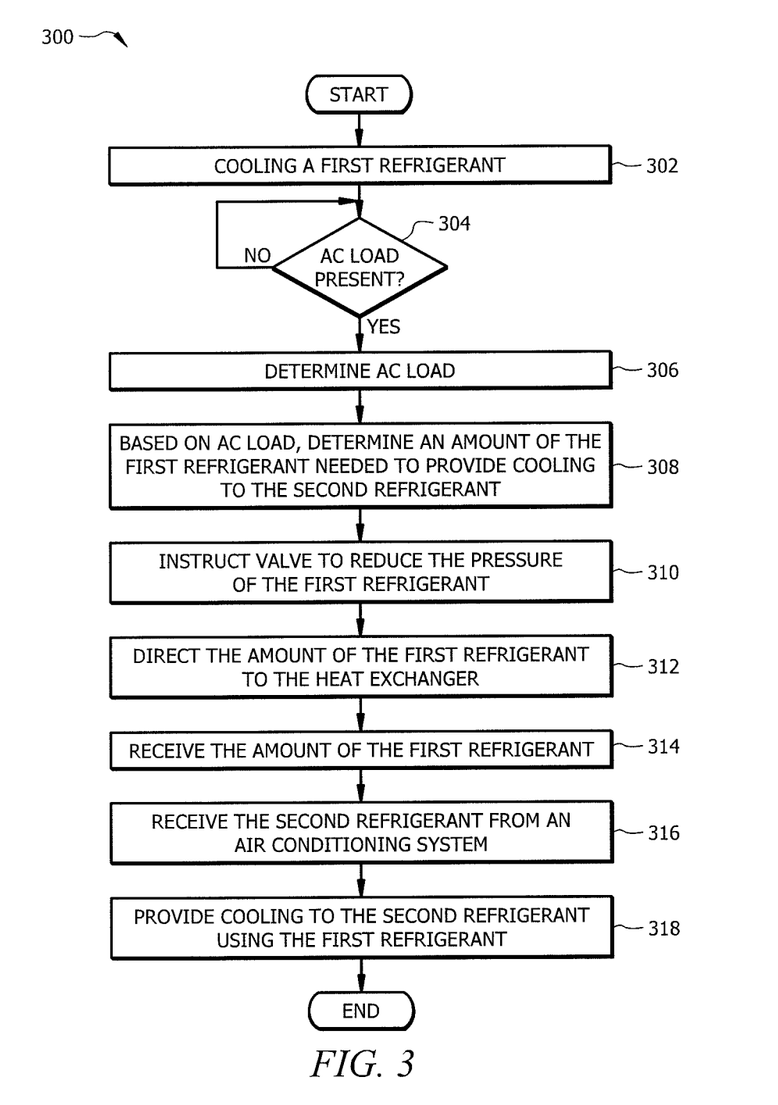
FIG. 3 is a flowchart illustrating a method of operating an example refrigeration system.
Figure 4:
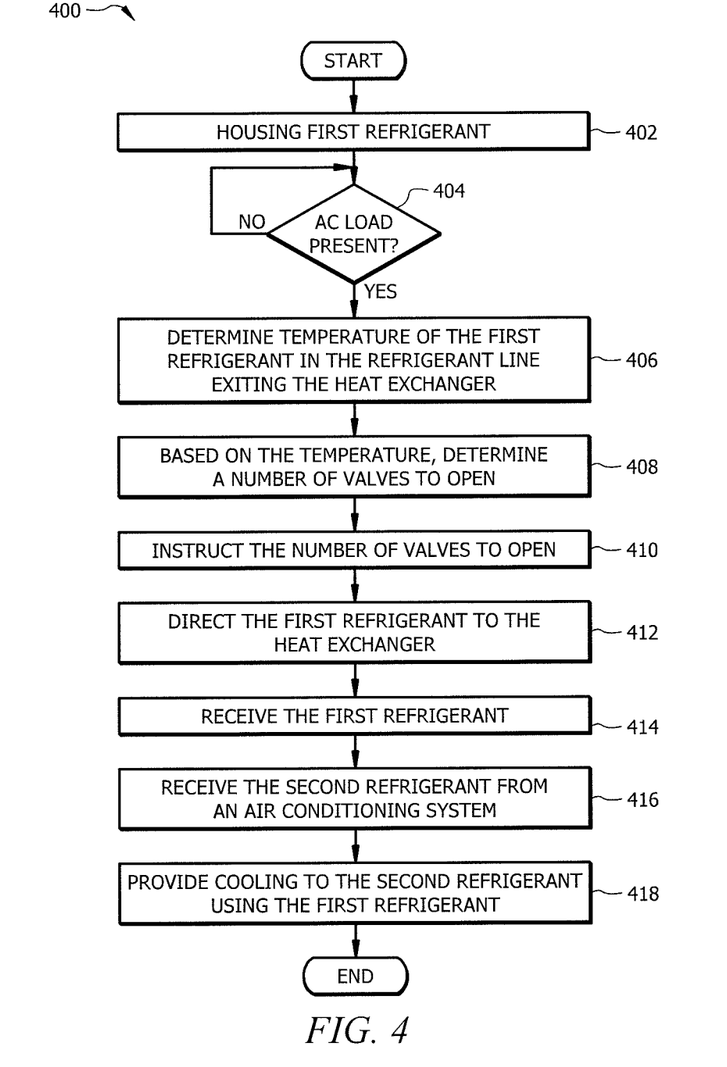
FIG. 4 is a flowchart illustrating a method of operating an example refrigeration system.

This disclosure introduces multiple embodiments that may facilitate integrating the refrigeration system and air conditioning system. One embodiment is illustrated in FIG. 1, which integrates an air conditioning system and a refrigeration system using a high pressure expansion valve and heat exchanger. FIG. 3 illustrates a method of integration that may utilize one or more components of FIG. 1. A particular embodiment is illustrated in FIG. 2, which integrates an air conditioning system and a refrigeration system using parallel solenoid valves, a check valve, and a heat exchanger. FIG. 4 illustrates a method of integration that may utilize one or more components of FIG. 2.

FIG. 1 is a block diagram illustrating example system 100 according to some embodiments. System 100 includes a gas cooler 130, one or more high pressure expansion valves 135 and 150, flash tank 105, one or more expansion valves 110 corresponding to one or more evaporators 115 (also referred to as refrigeration cases 115), one or more compressors 120, electronic expansion valve 106, and AC heat exchanger 140. Particular embodiments may include controller 111.

In general, system 100 integrates a refrigeration system and an air conditioning system by utilizing the refrigerant of the refrigeration system to cool the refrigerant of the air conditioning system. Specifically, system 100 is configured to cycle refrigerant such that MT case 115b and LT case 115a remain cooled to a certain temperature (e.g., to keep frozen foods frozen or refrigerated), and such that the refrigerant may be directed by high pressure expansion valve 150 to AC heat exchanger 140 and provide cooling to a second refrigerant associated with an air conditioning system.

First valve 110a may be configured to discharge low-temperature liquid refrigerant to first evaporator 115a (also referred to herein as low-temperature ("LT") case 115a). Second valve 110b may be configured to discharge medium-temperature liquid refrigerant to evaporator 115b (also referred to herein as medium-temperature ("MT") case 115b). In certain embodiments, LT case 115a and MT case 115b may be installed in a grocery store and may be used to store frozen food and refrigerated fresh food, respectively.

In some embodiments, first evaporator 115a may be configured to discharge warm refrigerant vapor to first compressor 120a (also referred to herein as an LT compressor 120a) and second evaporator 115b may be configured to discharge warm refrigerant vapor to a second compressor 120b (also referred to herein as an MT compressor 120b). In such a refrigeration system, first compressor 120a provides a first stage of compression to the warmed refrigerant from the LT case 115a and discharges the compressed refrigerant to second compressor 120b.

For example, in certain embodiments, the compressed refrigerant discharged from first compressor 120a joins the warm refrigerant discharged from MT case 115b and flows to second compressor 120b for compression. The inlet to second compressor 120b may be referred to as MT suction. The refrigerant discharged from second compressor 120b may then be discharged to gas cooler 130 for cooling. At this phase the refrigerant is at a high pressure and high temperature (e.g., 92 bar and 120 degrees Celsius).

Gas cooler 130 discharges refrigerant, which may continue to high pressure expansion valve 135. High pressure expansion valve 135 reduces the pressure of the refrigerant, which results in a mixture of vapor and liquid refrigerant. The mixed-state refrigerant then flows from high pressure expansion valve 135 through flash tank 105 where it is separated into vapor (i.e., flash gas) and liquid refrigerant.

The liquid refrigerant flows from the flash tank 105 to one or more of the cases 115 through expansion valves 110 and the cycle begins again. The vapor refrigerant flows from the flash tank 105 to one or more of MT compressor 120b or parallel compressor 120c when parallel compressor 120c is in operation.

A second high pressure expansion valve 150, similar to valve 135, reduces the pressure of the refrigerant, which results in a mixture of vapor and liquid refrigerant. However, the refrigerant then flows from high pressure expansion valve 150 to heat exchanger 140. High pressure expansion valve 150 directs an amount of the flow of refrigerant to heat exchanger 140 so that it may provide cooling for an AC load from an air conditioning system. In some embodiments, controller 111 may use the AC load to determine the amount of refrigerant necessary to provide adequate cooling and may direct high pressure expansion valve 150 to redirect that amount of refrigerant, as discussed further below. By only redirecting a portion of refrigerant flow from gas cooler 130, system 100 efficiently allows refrigerant to provide cooling to the AC load through heat exchanger 140 without requiring all of the refrigerant to be redirected away from flash tank.

AC heat exchanger 140 may comprise a plate heat exchanger, such as a brazed plate heat exchanger, a shell and tube heat exchanger, or any other heat exchanger suitable for cooling refrigerant. Although illustrated as a single heat exchanger in FIG. 1, this is not meant to be limiting, and system 100 may include any number of heat exchangers 140. Heat exchanger 140 may be used to exchange heat between the refrigerant in system 100 and a second refrigerant used in the air conditioning system that has an AC load (e.g., the temperature load/requirement to sufficient cool an enclosed space). Heat exchanger 140 comprises two refrigerant inlets and two refrigerant outlets. A first refrigerant inlet is coupled to gas cooler 130 through high pressure expansion valve 150. A second refrigerant inlet has an AC load from air conditioning system. The refrigerant received at the first refrigerant inlet is used to cool the refrigerant received at the second refrigerant inlet. The second refrigerant outlet discharges the cooled refrigerant from the second refrigerant inlet to the AC system to provide cooled air to an enclosed space (e.g., grocery store). The second refrigerant outlet may lead to an evaporator in the air conditioning system such that the refrigerant may cool down the building or enclosed space. The first refrigerant outlet discharges the refrigerant from the first refrigerant inlet towards parallel compressor 120c and then back to gas cooler 130.

In some embodiments, heat exchanger 140 receives the refrigerant from high pressure expansion valve 150. High pressure expansion valve may be opened and closed such that it directs a particular amount of the refrigerant from gas cooler 130 to heat exchanger 140. In some embodiments, heat exchanger 140 also receives a second refrigerant from an air conditioning system, where the air conditioning system has an AC load (e.g., cooling an enclosed space to 68 degrees Fahrenheit, providing medium cooling). Heat exchanger 140 may receive all of the second refrigerant from air conditioning system, or simply a portion of it, depending on the AC load. In some embodiments, the AC load may be determined by measuring the superheat of the refrigerant exiting heat exchanger 140. Finally, in some embodiments, heat exchanger 140 may provide cooling to the second refrigerant (e.g., AC refrigerant, glycol water) using the first refrigerant (e.g., $CO_2$ from system 100), as explained above. By using heat exchanger 140, a transcritical booster system and an air conditioning system may be integrated to create system 100. Combining transcritical booster system and an air conditioning system into integrated system 100 reduces the number of components required (e.g., flash tank 105, gas cooler 130), the energy expended to cool refrigerant for an AC system, and the resources in maintaining two separate systems rather than one integrated system.

In some embodiments, refrigeration system 100 may be configured to circulate natural refrigerant such as carbon dioxide ($CO_2$). Some embodiments may use any suitable refrigerant. Natural refrigerants may be associated with various environmentally conscious benefits (e.g., they do not contribute to ozone depletion and/or global warming effects). As an example, certain embodiments can be implemented in a transcritical refrigeration system (i.e., a refrigeration system in which the heat rejection process occurs above the critical point) comprising a gas cooler and circulating the natural refrigerant $CO_2$.

As discussed above, refrigeration system 100 includes one or more compressors 120. Refrigeration system 100 may include any suitable number of compressors 120. Compressors 120 may vary by design and/or by capacity. For example, some compressor designs may be more energy efficient than other compressor designs and some compressors 120 may have modular capacity (i.e., capability to vary capacity). As described above, compressor 120a may be an LT compressor that is configured to compress refrigerant discharged from an LT case (e.g., LT case 115a) and compressor 120b may be an MT compressor that is configured to compress refrigerant discharged from an MT case (e.g., MT case 115b).

In some embodiments, refrigeration system 100 includes a parallel compressor 120c. Parallel compressor 120c may be configured to provide supplemental compression to refrigerant circulating through refrigeration system 100. For example, parallel compressor 120c may be operable to compress refrigerant after it exits heat exchanger 140 before returning to gas cooler 130. As another example, parallel compressor 120c may be operable to compress vapor (e.g., flash gas) from flash tank 105 before returning it to gas cooler 130. In some embodiments, parallel compressor 120c may receive the first refrigerant from flash tank 105 and/or heat exchanger 140. Parallel compressor 120c may compress the refrigerant and prove the first refrigerant to gas cooler 130 such that refrigerant may be cooled and directed back to flash tank 105. By adding parallel compressor 120c, system 100 consumes less energy. Rather than feeding the refrigerant exiting heat exchanger back through flash tank 105, expansion valve 106, and MT compressor 120b, the refrigerant goes through parallel compressor 120c and straight back to gas cooler 130. This pathway through parallel compressor 120c eliminates the need to drop the pressure of the refrigerant first before entering compression (e.g., through MT compressor 120b), instead, the refrigerant is immediately compressed without changing its pressure, thus conserving the energy it would use to change the pressure.

As depicted in FIG. 1, refrigeration system 100 may include one or more gas coolers 130 in some embodiments. Gas cooler 130 is configured to receive compressed refrigerant vapor (e.g., from MT and parallel compressors 120b, 120c) and cool the received refrigerant. In some embodiments, gas cooler 130 is a heat exchanger comprising cooler tubes configured to circulate the received refrigerant and coils through which ambient air is forced. Inside gas cooler 130, the coils may absorb heat from the refrigerant and rejects to ambient, thereby providing cooling to the refrigerant.

In some embodiments, refrigeration system 100 includes electronic expansion valve 106. Expansion valve 106 controls the flow of refrigerant. Expansion valve 106 may comprise a thermostatic expansion valve, an electronic expansion valve, or any other suitable expansion valve. Expansion valve 106 may be configured to direct the flash gas from flash tank 105 to be compressed at MT compressor 120b and then cooled by gas cooler 130. In this way, the flash gas from flash tank 105 may be compressed, then cooled, and directed through high pressure expansion valve 135 such that it is in liquid and vapor mixture form when it is returned to flash tank 105. The liquid may be directed through MT liquid line and LT liquid line in order to cool MT case 115b and LT case 115a.

Refrigeration system 100 may include a flash tank 105 in some embodiments. Flash tank 105 may be configured to receive mixed-state refrigerant and separate the received refrigerant into flash gas and liquid refrigerant. Typically, the flash gas collects near the top of flash tank 105 and the liquid refrigerant is collected in the bottom of flash tank 105. In some embodiments, the liquid refrigerant flows from flash tank 105 and provides cooling to one or more evaporates (cases) 115 and the flash gas flows to one or more compressors (e.g., MT compressor 120b and/or parallel compressor 120c) for compression.

Refrigeration system 100 may include one or more evaporators 115 in some embodiments. As depicted in FIG. 1, the refrigeration system includes two evaporators 115 (LT case 115a and MT case 115b). As described above, LT case 115a may be configured to receive liquid refrigerant of a first temperature and MT case 115b may be configured to receive liquid refrigerant of a second temperature, wherein the first temperature (e.g., −29° C.) is lower in temperature than the second temperature (e.g., −7° C.). As an example, an LT case 115a may be a freezer in a grocery store and an MT case 115b may be a cooler in a grocery store.

In some embodiments, the liquid refrigerant leaves flash tank 105 through a first line to the LT case and a second line to the MT case. When the refrigerant leaves flash tank 105, the temperature and pressure in the first line may be the same as the temperature and pressure in the second line (e.g., 4° C. and 38 bar). Before reaching cases 115, the liquid refrigerant may be directed through one or more expansion valves 110 (e.g., 110a and 110b of FIG. 1). In some embodiments, each valve may be controlled (e.g., by controller 111 described below) to adjust the temperature and pressure of the liquid refrigerant.

For example, valve 110a may be configured to discharge the liquid refrigerant at −29° C. to LT case 115a and valve 110b may be configured to discharge the liquid refrigerant at −7° C. to MT case 115b. In some embodiments, each evaporator 115 is associated with a particular valve 110 and the valve 110 controls the temperature and pressure of the liquid refrigerant that reaches that evaporator 115.

Refrigeration system 100 may include at least one controller 111 in some embodiments. Controller 111 may be configured to direct the operations of the refrigeration system. Controller 111 may be communicably coupled to one or more components of the refrigeration system (e.g., flash tank 105, expansion valves 110, evaporators 115, compressors 120, gas cooler 130, high pressure expansion valve 150, high pressure expansion valve 135, heat exchanger 140, and any refrigeration lines of system 100).

Controller 111 may be configured to control the operations of one or more components of refrigeration system 100. For example, controller may instruct high pressure expansion valve 150 to direct an amount of refrigerant to heat exchanger 140. As another example, controller 111 may be configured to turn parallel compressor 120c on and off. As another example, controller 111 may be configured to open and close valve(s) 150, 135, 106, and 110. As another example, controller 111 may be configured to adjust a set point for the pressure of flash tank 105. In some embodiments, controller 111 may further be configured to receive information about the refrigeration system from one or more sensors. As an example, controller 111 may receive information about the ambient temperature of the environment (e.g., outdoor temperature) from one or more sensors. As another example, controller 111 may receive information about the system load from sensors associated with compressors 120. As yet another example, controller 111 may receive information about the temperature and/or pressure of the refrigerant from sensors positioned at any suitable point(s) in the refrigeration system (e.g., temperature at the outlet of gas cooler 130, suction pressure of MT compressor 120b, pressure of flash tank 105, temperature or pressure at heat exchanger 140, etc.).

In some embodiments, controller 111 may be configured to determine the AC load from air conditioning system. Controller 111 may receive information about refrigerant exiting or entering heat exchanger 140 (e.g., refrigerant for AC system and/or for transcritical system) and determine the superheat associated with the refrigerant. Using the superheat, controller 111 may determine the AC load that needs to be met such that air conditioning system adequately cools an enclosed space (e.g., grocery store, ice cream shop).

In some embodiments, controller 111 may be configured to determine the amount of refrigerant to be supplied to heat exchanger 140 to meet the AC load. The amount of refrigerant may be a volume amount, the temperature of the refrigerant, the pressure of the refrigerant, or any other characteristic associated with the refrigerant that renders it able to meet the AC load.

In some embodiments, controller 111 may be configured to instruct high pressure expansion valve 150 to direct an amount of refrigerant to heat exchanger 140. Controller 111 may instruct high pressure expansion valve 150 to open and close such that the amount of refrigerant is directed to heat exchanger 140. Controller 111 may also operate high pressure expansion valve to drop the pressure of the refrigerant to an amount or pressure necessary to meet the AC load. For example, the carbon dioxide entering heat exchanger 140 after going through high pressure expansion valve 150 may be at 30 degrees Fahrenheit and in liquid and vapor mixture form. Then, heat exchanger 140 is able to cool the second refrigerant in the air conditioning system using the first refrigerant from system 100. This provides an integrated, combined system that is operable to cool specific cases (e.g., for frozen items or refrigerated items) as well as provide air conditioning to the larger store or enclosed space (ice cream shop, grocery store). This integrated system reduces or eliminates the components and energy necessary to independently cool the refrigerant in AC system.

As described above, controller 111 may be configured to provide instructions to one or more components of the refrigeration system. Controller 111 may be configured to provide instructions via any appropriate communications link (e.g., wired or wireless) or analog control signal. As depicted in FIG. 1, controller 111 is configured to communicate with components of the refrigeration system. For example, in response to receiving an instruction from controller 111, refrigeration system 100 may adjust an amount of refrigerant flowing through high pressure expansion valve 150. In some embodiments, controller 111 includes or is a computer system.

This disclosure recognizes that a refrigeration system, such as that depicted in FIG. 1, may comprise one or more other components. As an example, system 100 may provide subcooling to the first refrigerant before it enters AC heat exchanger 140. As another example, the refrigeration system may comprise one or more suction accumulators in some embodiments. Some systems may include a booster system with ejectors. One of ordinary skill in the art will appreciate that the refrigeration system may include other components not mentioned herein.

When one component of system 100 is referred to as coupled to another component of system 100, the two components may be directly or indirectly coupled. For example, flash tank 105 may be coupled to evaporators 115a and 115b via a refrigerant line (illustrated as connecting lines with arrows indicating the direction of refrigerant flow) through expansion valves 110a and 110b. As another example, gas cooler 130 may be coupled to flash tank 105 and heat exchanger 140 via refrigerant lines through high pressure expansion valves 135 and 150, respectively.

Modifications, additions, or omissions may be made to the systems described herein without departing from the scope of the disclosure. For example, system 100 may include any number of controllers 111, heat exchangers 140, flash tanks 105, evaporators 115, expansion valves 110, and compressors 120. The components may be integrated or separated. Moreover, the operations may be performed by more, fewer, or other components. Additionally, the operations may be performed using any suitable logic comprising software, hardware, and/or other logic.

FIG. 2 is a block diagram illustrating example system 200 according to some embodiments. System 200 includes a gas cooler 230, flash tank 205, one or more expansion valves 210 corresponding to one or more evaporators 215 (also referred to as refrigeration cases 215), one or more compressors 220, high pressure expansion valve 235, check valve 280, flash gas bypass valve 206, heat exchanger 245, one or more solenoid valves 250, temperature probe 260, AC heat exchanger 240, and three way valve 290. Particular embodiments may include controller 111.

In general, system 200 integrates a refrigeration system and an air conditioning system by utilizing the refrigerant of the refrigeration system to cool the refrigerant of the air conditioning system. Specifically, system 200 is configured to cycle refrigerant such that MT case 215b and LT case 215a remain cooled to a certain temperature (e.g., to keep frozen foods frozen or refrigerated), and such that the refrigerant may be directed by one or more solenoid valves 250 to AC heat exchanger 240 and provide cooling to a second refrigerant associated with an air conditioning system.

In some embodiments, certain components of FIG. 2 may operate as certain components described in FIG. 1. Specifically gas cooler 230 may operate as gas cooler 130 of FIG. 1, flash tank 205 may operate as flash tank 105 of FIG. 1, one or more expansion valves 210 corresponding to one or more evaporators 215 (also referred to as refrigeration cases 215) may operate as expansion valves 110 and evaporators 115 of FIG. 1, one or more compressors 220 may operate as compressors 120 of FIG. 1, flash gas bypass valve 206 may operate as electronic expansion valve 106 of FIG. 1, and high pressure expansion valve 235 may operate as high pressure expansion valve 135 of FIG. 1. Although these may be described in more detail below, the descriptions of the components from FIG. 1 are incorporated here for the corresponding components of FIG. 2.

In some embodiments, refrigeration system 200 may be configured to circulate natural refrigerant such as carbon dioxide ($CO_2$). Some embodiments may use any suitable refrigerant. Natural refrigerants may be associated with various environmentally conscious benefits (e.g., they do not contribute to ozone depletion and/or global warming effects). As an example, certain embodiments can be implemented in a transcritical refrigeration system (i.e., a refrigeration system in which the heat rejection process occurs above the critical point) comprising a gas cooler and circulating the natural refrigerant $CO_2$.

In some embodiments, temperature probe 260, may be a component configured to determine the temperature of the refrigerant in the refrigerant line it is coupled to. For example, temperature probe 260 may determine the temperature of the first refrigerant exiting AC heat exchanger 240, which entered from solenoid valve(s) 250. In some embodiments, temperature probe 260 is coupled to controller 211 and may send data regarding the temperature of the refrigerant leaving AC heat exchanger 240 to controller 211.

In some embodiments, one or more solenoid valves 250 may direct liquid refrigerant from flash tank 205 to AC heat exchanger 240. The one or more solenoid valves 250 may be coupled to flash tank 205 and AC heat exchanger 240. In some embodiments, system 200 may comprise one, two, three, or any number of solenoid valves 250. In some embodiments, solenoid valves 250 are opened and closed to control the flow of refrigerant from flash tank 205 to AC heat exchanger 240. For example, opening solenoid valves 250*a* and 250*b* will result in more refrigerant being directed to AC heat exchanger 240 than if only solenoid valve 250*a* were open.

In some embodiments, the one or more solenoid valves 250 may be configured to reduce a pressure of the refrigerant flowing from flash tank 205. For example, solenoid valve 250 may reduce the pressure of the refrigerant by 3-5 pounds per square inch (psi). Reducing the pressure may lower the temperature of the refrigerant for AC heat exchanger 240. However, because the refrigerant is being used for an air conditioning load (e.g., 37 degrees Fahrenheit), it does not need to be as cold as a refrigerant being used for a LT case 215*a* (frozen items around 30 degrees Fahrenheit or below) or MT case 215*b* (refrigerated items around 30-37 degrees Fahrenheit). Thus, solenoid valve 250 need not reduce the pressure of the refrigerant the same amount that other valves may. Further, because the refrigerant exiting AC heat exchanger 240 (now in vapor form) is joined with refrigerant exiting flash tank 205 via check valve 280 before entering heat exchanger 245 and compressor 220, it is beneficial for the two refrigerants to maintain about the same pressure (within 5-7 psi). Because solenoid valves 250 reduce the pressure of a refrigerant by less than some other valves, the refrigerants from AC heat exchanger 240 and check valve 280 maintain about the same pressure and move through the refrigerant lines evenly. Further, solenoid valves 250 may be cheaper and simpler to operate than some other valves. In some embodiments, solenoid valves 250 may be replaced by other valves configured to provide varying amounts of refrigerant to AC heat exchanger 240 and to reduce the pressure of the refrigerant, as described above. As one example, system 200 may include a stepper valve in addition to or instead of one or more solenoid valves 250.

In some embodiments, AC heat exchanger 240 may comprise a plate heat exchanger, such as a brazed plate heat exchanger, a shell and tube heat exchanger, or any other heat exchanger suitable for cooling refrigerant. Although illustrated as a single heat exchanger in FIG. 2, this is not meant to be limiting, and system 200 may include any number of heat exchangers 240 to provide cooling for the AC load. In some embodiments, AC heat exchanger 240 may operate may operate as AC heat exchanger 140 of FIG. 1. Further, AC heat exchanger 240 may be used to exchange heat between the refrigerant in system 200 and a second refrigerant used in the air conditioning system that has an AC load (e.g., the temperature load/requirement to sufficient cool an enclosed space). Heat exchanger 240 comprises two refrigerant inlets and two refrigerant outlets. A first refrigerant inlet is coupled to flash tank 205 through one or more solenoid valves 250. A second refrigerant inlet has an AC load from air conditioning system. The refrigerant received at the first refrigerant inlet (e.g., from solenoid valves 250) is used to cool the refrigerant received at the second refrigerant inlet (e.g., from air conditioning system). The second refrigerant outlet may lead to an evaporator in the air conditioning system such that the refrigerant may cool down the building or enclosed space. The first refrigerant outlet discharges the refrigerant from the first refrigerant inlet towards heat exchanger 240, parallel compressor 220*c*, and then back to gas cooler 230.

In some embodiments, AC heat exchanger 240 is coupled to one or more solenoid valves 250*a-c* such that it may receive an amount of the first refrigerant from the one or more solenoid valves 250*a-c*. As explained above, solenoid valves 250*a-c* may be opened and closed so that a specific amount of the first refrigerant is delivered to AC heat exchanger 240.

In some embodiments, AC heat exchanger 240 is coupled to an air conditioning system, or at least one component of an air conditioning system, so that it may receive a second refrigerant. For example, air conditioning system may use glycol water as a refrigerant to provide cooling to an enclosed space. The second refrigerant may be associated with an air conditioning load (AC load) to indicate the amount that the second refrigerant needs to be cooled to provide proper cooling to the enclosed space. For example, the AC load may be a specific temperature, a degree of load (high, medium, low), or any other rating system that indicates the amount of cooling required. Once AC heat exchanger 240 receives the second refrigerant, it cools the second refrigerant using the first refrigerant (e.g., carbon dioxide) the is circulated through system 200.

In some embodiments, system 200 may comprise an additional heat exchanger 245. In some embodiments, heat exchanger 245 may comprise a plate heat exchanger, such as a brazed plate heat exchanger, a shell and tube heat exchanger, or any other heat exchanger suitable for cooling refrigerant. Heat exchanger 245 may be used to exchange heat between the vapor refrigerant flowing from flash tank 205 and the refrigerant coming from gas cooler 230. Having this additional heat exchanger 245 allows for the vapor refrigerant flowing from flash tank 205 to undergo additional cooling before being compressed in parallel compressor 220c and helps with efficiency.

In some embodiments, check valve 280 may control the flow and pressure of the refrigerant leaving flash tank 205 and flowing to the refrigerant line exiting AC heat exchanger 240. For example, check valve 280 may be a 0.3-1 bar check valve. In some embodiments, check valve 280 directs the flow of refrigerant such that the amount being processed by parallel compressor 220c is about the same as the refrigerant being processed by MT compressor 220b. In some embodiments, as the AC load changes, check valve 280 may direct more or less flow from flash tank 205 to parallel compressor 220c. For example, as the AC load increases (e.g., in hot months), solenoid valves 250 may deliver additional refrigerant to AC heat exchanger 240, and thus to parallel compressor 220c.

In embodiments, check valve 280 also regulates the pressure of refrigerant leaving flash tank 205. Check valve 280 may decrease the pressure of vapor leaving flash tank 205 such that it is at about the same pressures as the vapor exiting AC heat exchanger 240. Because the refrigerant from check valve 280 and the refrigerant from AC heat exchanger 240 are joined in a refrigerant line before entering parallel compressor 220c (via heat exchanger 245), they need to have about the same pressure so that the refrigerant flows through system 200 evenly.

In some embodiments, three way valve 290 may direct the flow of refrigerant from LT compressor 220a. Three way valve 290 may deliver some refrigerant to MT compressor 220b and some refrigerant to a refrigerant line that is processed by parallel compressor 220c via heat exchanger 245. For example, in colder months, the AC load may be less and AC heat exchanger 240 may require less refrigerant. In this example, less refrigerant is flowing from flash tank 205 to parallel compressor 220 (via heat exchanger 245 and AC heat exchanger 240), and more may be flowing through MT and LT liquid lines. Three way valve 290 may direct an amount of refrigerant (e.g., all, some, or little) from LT compressor 220a to flow through parallel compressor 220c to keep parallel compressor 220c operating.

Refrigeration system 200 may include at least one controller 211 in some embodiments. Controller 211 may be configured to direct the operations of refrigeration system 200. Controller 211 may be communicably coupled to one or more components of the refrigeration system (e.g., flash tank 205, expansion valves 210, evaporators 215, compressors 220, gas cooler 230, heat exchanger 240, solenoid valves 250, check valve 280, three way valve 290, and any refrigeration lines of system 200).

Controller 211 may be configured to control the operations of one or more components of refrigeration system 200. For example, controller may instruct one or more solenoid valves 250 to direct an amount of refrigerant to heat exchanger 240. As another example, controller 211 may be configured to turn parallel compressor 220c on and off. As another example, controller 211 may be configured to open and close valve(s) 250, 235, 206, and 210. As another example, controller 211 may be configured to adjust a set point for the pressure of flash tank 205.

In some embodiments, controller 211 may further be configured to receive information about the refrigeration system from one or more sensors. As an example, controller 211 may receive information about the ambient temperature of the environment (e.g., outdoor temperature) from one or more sensors. As another example, controller 211 may receive information about the system load from sensors associated with compressors 220. As yet another example, controller 211 may receive information about the temperature and/or pressure of the refrigerant from sensors positioned at any suitable point(s) in the refrigeration system (e.g., temperature at outlet of AC heat exchanger 240 using temperature probe 260, temperature at the outlet of gas cooler 230, suction pressure of MT compressor 220b, pressure of flash tank 205, temperature or pressure at heat exchanger 240, etc.).

In some embodiments, controller 211 may determine a temperature of the first refrigerant in the refrigerant line exiting heat exchanger 240. Controller 211 may determine the temperature using data received from temperature probe 260 or any other means of detecting the temperature. The temperature may indicate whether AC heat exchanger 240 requires more or less refrigerant from solenoid valves 250 in order to sufficiently cool the second refrigerant from the air conditioning system to meet the AC load.

In some embodiments, based on the temperature of the first refrigerant in the refrigerant line exiting the heat exchanger, controller 211 determines a number of the one or more solenoid valves to open. For example, when temperature probe 260 is above a certain threshold, controller 211 may determine that there is not enough refrigerant being used to cool the second refrigerant from the air conditioning system and meet the AC load. Thus, controller 211 may instruct that an additional solenoid valve 250b be opened. Once solenoid valve 250b is opened, additional refrigerant may be passed through AC heat exchanger 240 such that the refrigerant can provide additional cooling to the second refrigerant from the air conditioning system with the AC load. Because there is additional refrigerant to provide cooling, the refrigerant will not lose as much heat, and thus the temperature of the refrigerant leaving heat exchanger 240 will be at a lower temperature than when only one solenoid valve 250a was open. In some embodiments, controller 211 may determine the amount the temperature is above a threshold and use that to determine the number of solenoid valves to open. For example, if the threshold is 35 degrees Fahrenheit, and the temperature of the refrigerant exiting AC heat exchanger 240 is 38 degrees Fahrenheit, then controller 211 may determine that another solenoid valve 250 needs to be opened. Once controller 211 determines how many solenoid valves 250 to open, controller 211 sends an instruction to the solenoid valves 250 to open. For example, if solenoid valve 250a is open, and controller 211 determines that one more valve 250 needs to be opened, it may send an instruction to solenoid valve 250c to open.

This disclosure recognizes that a refrigeration system, such as system 200 depicted in FIG. 2, may comprise one or more other components. As another example, the refrigeration system may comprise one or more suction accumulators in some embodiments (e.g., parallel compressor 220c suction may add an accumulator). Some systems may include a booster system with ejectors. One of ordinary skill in the art will appreciate that the refrigeration system may include other components not mentioned herein.

When one component of system 200 is referred to as coupled to another component of system 200, the two components may be directly or indirectly coupled. For example, flash tank 205 may be coupled to evaporators 215a and 215b via a refrigerant line (illustrated as connecting lines with arrows indicating the direction of refrigerant flow) through expansion valves 210a and 210b. As another example, gas cooler 230 may be coupled to flash tank 205 via refrigerant lines through high heat exchanger 245 and high pressure expansion valve 235.

Modifications, additions, or omissions may be made to the systems described herein without departing from the scope of the disclosure. For example, system 200 may include any number of controllers 211, heat exchangers 240 and 245, flash tanks 205, evaporators 215, expansion valves 210, and compressors 220. The components may be integrated or separated. Moreover, the operations may be performed by more, fewer, or other components. Additionally, the operations may be performed using any suitable logic comprising software, hardware, and/or other logic.

FIG. 3 is a flowchart illustrating method 300 of operating an example refrigeration system. Generally, method 300 utilizes the refrigerant from the refrigeration system to cool the refrigerant from the air conditioning system, resulting in an efficient integrated system. Method 300 begins at step 302, in some embodiments, where a first refrigerant is cooled. In some embodiments, a gas cooler may provide cooling to the first refrigerant (e.g., the carbon dioxide used in the refrigeration system).

At step 304, in some embodiments, method 300 determines whether an AC load is present. The AC load may be the temperature demand for an air conditioning system. If there is no AC load present (e.g., no air conditioning is needed for an enclosed space), then method 300 waits at step 304 and continues to test whether an AC load is present. Once method 300 it determines there is an AC load present, it continues to step 306, in some embodiments, where method 300 determines the AC load associated with a second refrigerant. The second refrigerant and the AC load may further be associated with an air conditioning system. By understanding the AC load, method 300 may then, at step 308 in some embodiments, determine an amount of the first refrigerant needed to provide sufficient cooling to the second refrigerant based on the AC load. Method 300 may determine the amount of refrigerant as a volume of refrigerant, a pressure of refrigerant, a temperature or refrigerant, a number of valves to open to deliver the refrigerant (thus increasing and/or decreasing the volume of refrigerant based on the number of valves opened or closed), and/or a length of time to leave a valve open (e.g., increasing the volume of refrigerant the longer the valve is open).

At step 310, in some embodiments, method 300 instructs a valve to reduce the pressure of the first refrigerant. As the refrigerant flows through the valve (e.g., high pressure expansion valve 150 of FIG. 1), the pressure may be reduced in order to cool the refrigerant further and/or so that the pressure of the refrigerant matches the pressure of the refrigerant elsewhere in the system (e.g., exiting heat exchanger).

At step 312, in some embodiments, method 300 directs the amount of the first refrigerant to the heat exchanger, and at step 314, in some embodiments, method 300 receives the amount of the first refrigerant. The first refrigerant may be received at heat exchanger (e.g., AC heat exchanger 140 of FIG. 1). In some embodiments, the valve that reduces the pressure of the first refrigerant in step 310 also directs the flow of refrigerant to the heat exchanger. Once the first refrigerant is received by the heat exchanger, it may be used to provide cooling.

At step 316, in some embodiments, method 300 receives the second refrigerant from the air conditioning system and provides cooling to the second refrigerant using the first refrigerant at step 318. The temperature of the first refrigerant may be lower than the temperature of the second refrigerant such that heat may be transferred from the second refrigerant to the first refrigerant. This may result in the second refrigerant being cooled to a temperature that it may cycle through the air conditioning system and provide cooling to an enclosed space. After the second refrigerant is cooled, the method ends.

Modifications, additions, or omissions may be made to method 300 depicted in FIG. 3. Method 300 may include more, fewer, or other steps. For example, steps may be performed in parallel or in any suitable order, and steps may be omitted. While the examples discussed in method 300 included various components of systems 100 and 200 performing the steps, any suitable component or combination of components may perform one or more steps of the method.

FIG. 4 is a flowchart illustrating method 400 of operating an example refrigeration system. Generally, method 400 utilizes the refrigerant from the refrigeration system to cool the refrigerant from the air conditioning system, resulting in an efficient integrated system. Method 400 begins at step 402, in some embodiments, where a first refrigerant is housed. In some embodiments, the first refrigerant may be housed in a flash tank, gas cooler, or any component of a refrigeration system configured to house a first refrigerant.

At step 404, in some embodiments, method 404 determines whether an AC load is present. In some embodiments, one or more aspects of step 404 may be implemented using one or more techniques discussed above with respect to step 304 of method 300, illustrated in FIG. 3. Once method 400 determines there is an AC load present, it continues to step 406 where it determines the temperature of the first refrigerant in the refrigerant line exiting the heat exchanger. The temperature of the first refrigerant may indicate to what extent the first refrigerant was needed to cool the second refrigerant from an air conditioning system. For example, if the second refrigerant enters a heat exchanger at 40 degrees Fahrenheit and needs to be cooled to 37 degrees Fahrenheit, then it will cause the first refrigerant from the refrigeration system to be warmer. Thus, as the temperature of the first refrigerant exiting heat exchanger goes up, the more refrigerant needed to sufficiently cool the second refrigerant from the air conditioning system.

At step 408, in some embodiments, method 400 determines the number of valves to open based on the temperature determined in step 406. In some embodiments, the higher the temperature, the more valves that need to be opened. If more valves are open, then more refrigerant may be supplied to the heat exchanger. That additional refrigerant will be able to cool the second refrigerant from the air conditioning system more efficiently, and thus it will not increase as much in temperature (as measured in step 406).

At step 410, in some embodiments, method 400 instructs the number of valves to open that were determined in step 408. A controller may instruct the valves to open. Once the valves are open, method 400 directs the first refrigerant to the heat exchanger in step 412 and at step 414 method 400 receives the first refrigerant. The first refrigerant may be received at heat exchanger (e.g., AC heat exchanger 140 of FIG. 1 or AC heat exchanger 240 of FIG. 2). Once the first refrigerant is received by the heat exchanger, it may be used to provide cooling.

At step 416, in some embodiments, method 400 receives the second refrigerant from the air conditioning system and provides cooling to the second refrigerant using the first refrigerant at step 418. The temperature of the first refrigerant may be lower than the temperature of the second refrigerant such that heat may be transferred from the second refrigerant to the first refrigerant. This may result in the second refrigerant being cooled to a temperature that it may cycle through the air conditioning system and provide cooling to an enclosed space. In some embodiments, one or more aspects of steps 412, 414, 416, and 418 may be implemented using one or more techniques discussed above with respect to steps 312, 314, 316, and 318, respectively of method 300, illustrated in FIG. 3. After the second refrigerant is cooled, the method ends.

Modifications, additions, or omissions may be made to method 300 depicted in FIG. 4. Method 400 may include more, fewer, or other steps. For example, steps may be performed in parallel or in any suitable order, and steps may be omitted. While examples discussed included various components of systems 100 and 200 performing the steps, any suitable component or combination of components may perform one or more steps of the method.

Figure 5:
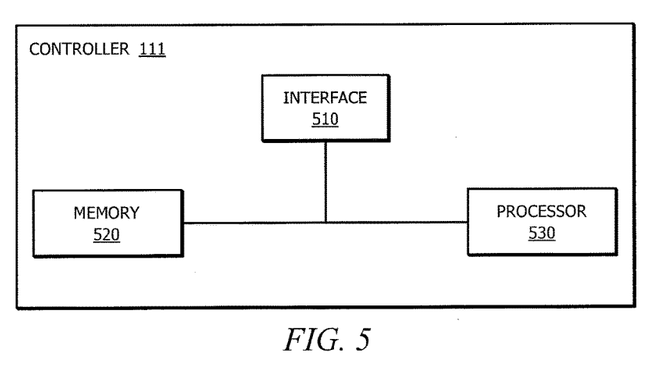
FIG. 5 illustrates an example of a controller of a refrigeration system, according to certain embodiments.

FIG. 5 illustrates an example of a controller of a refrigeration system, according to certain embodiments. Controller 111 of FIG. 5 be similar to controller 111 of FIG. 1 and/or controller 211 of FIG. 2, according to certain embodiments of the present disclosure. Controller 111 may comprise one or more interfaces 510, memory 520, and one or more processors 530. Interface 6510 may comprise hardware and/or software. Interface 510 receives input (e.g., sensor data or system data), sends output (e.g., instructions), processes the input and/or output, and/or performs other suitable operation. As examples, interface 510 receives information from sensors, such as information about the temperature of the refrigerant, receives information about the air conditioning load, and can instructions, such as instructing valves to open and close.

Processor 530 may include any suitable combination of hardware and software implemented in one or more modules to execute instructions and manipulate data to perform some or all of the described functions of controller 111. In some embodiments, processor 530 may include, for example, one or more computers, one or more central processing units (CPUs), one or more microprocessors, one or more applications, one or more application specific integrated circuits (ASICs), one or more field programmable gate arrays (FPGAs), and/or other logic. As examples, processor 530 may determine a temperature of the refrigerant, determine the amount of refrigerant needed to be used by a heat exchanger, and/or determine a number of valves to open to supply sufficient refrigerant to a heat exchanger.

Memory (or memory unit) 520 stores information. As an example, a memory may store temperature values, AC loads over time, and information about refrigerant. Memory 520 may comprise one or more non-transitory, tangible, computer-readable, and/or computer-executable storage media. Examples of memory 520 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to the systems, apparatuses, and methods described herein without departing from the scope of the disclosure. The components of the systems and apparatuses may be integrated or separated. Moreover, the operations of the systems and apparatuses may be performed by more, fewer, or other components. One skilled in the art will also understand that system 100 and 200 can include other components that are not illustrated but are typically included with refrigeration systems. Additionally, operations of the systems and apparatuses may be performed using any suitable logic comprising software, hardware, and/or other logic. As used in this document, "each" refers to each member of a set or each member of a subset of a set.

Although this disclosure has been described in terms of certain embodiments, alterations and permutations of the embodiments will be apparent to those skilled in the art, and it is intended that the present disclosure encompass such changes, variations, alterations, transformations, and modifications as fall within the scope of the appended claims. Accordingly, the above description of the embodiments does not constrain this disclosure. Other changes, substitutions, and alterations are possible without departing from the spirit and scope of this disclosure.

The invention claimed is:

1. A system, comprising:
a flash tank coupled to one or more refrigeration cases, the flash tank configured to house a first refrigerant;
one or more solenoid valves coupled to the flash tank, the one or more solenoid valves configured to reduce a pressure of the first refrigerant flowing from the flash tank to the first heat exchanger;
a first heat exchanger coupled to the one or more solenoid valves, the first heat exchanger configured to:
 receive an amount of the first refrigerant from the one or more solenoid valves;
 receive a second refrigerant, the second refrigerant associated with an air conditioning load;
 provide cooling to the second refrigerant, using the first refrigerant; and
a check valve coupled to the flash tank, the check valve configured to reduce a pressure of the first refrigerant flowing from the flash tank away from the one or more solenoid valves;
a temperature probe coupled to a refrigerant line exiting the first heat exchanger, the temperature probe configured to determine the temperature of the first refrigerant in the refrigerant line exiting the first heat exchanger;
a controller coupled to the temperature probe and the one or more solenoid valves, the controller configured to:
 determine a temperature of the first refrigerant in the refrigerant line exiting the heat exchanger;
 based on the temperature of the first refrigerant in the refrigerant line exiting the heat exchanger, determine a number of the one or more solenoid valves to open; and
 instruct the number of the one or more solenoid valves to open.

2. The system of claim 1, further comprising:
a gas cooler configured to cool the first refrigerant to a first temperature; and
a high pressure expansion valve coupled to the gas cooler, the high pressure expansion valve configured to reduce a pressure of the first refrigerant flowing from the gas cooler to the flash tank.

3. The system of claim 1, further comprising a compressor coupled to the first heat exchanger, the compressor configured to:
receive the first refrigerant from the check valve and the first heat exchanger;
compress the first refrigerant; and
provide the first refrigerant to a gas cooler, the gas cooler configured to cool the first refrigerant.

4. The system of claim 1, further comprising:
a low temperature compressor coupled to a low temperature refrigeration case, the low temperature compressor configured to compress the first refrigerant from the low temperature refrigeration case;
a medium temperature compressor coupled to a medium temperature refrigeration case and the low temperature compressor, the medium temperature compressor configured to compress the first refrigerant from the medium temperature refrigeration vase and the first refrigerant from the low temperature compressor;
a compressor coupled to the first heat exchanger, the compressor configured to compress the first refrigerant from the first heat exchanger; and
a three-way valve coupled to the low temperature compressor, the medium temperature compressor, and the parallel compressor, the three-way valve configured to:
direct first amount of the first refrigerant from the low temperature compressor to the medium temperature compressor; and
direct a second amount of the first refrigerant from the low temperature compressor to the parallel compressor.

5. The system of claim 1, further comprising:
a low temperature refrigeration case coupled to the flash tank, to low temperature refrigeration case being cooled by the first refrigerant from the flash tank;
a medium temperature refrigeration case coupled to the flash tank, the medium temperature case being cooled by the first refrigerant from the flash tank;
a low temperature compressor coupled to the low temperature refrigeration case, the low temperature compressor configured to compress the first refrigerant from the low temperature refrigeration case; and
a medium temperature compressor coupled to the medium temperature refrigeration case and the low temperature compressor, the medium temperature compressor configured to compress the first refrigerant from the medium temperature refrigeration case and the first refrigerant from the low temperature compressor.

6. The system of claim 1, wherein the first refrigerant comprises a carbon dioxide ($CO_2$) refrigerant.

7. A method of configuring a system, comprising:
coupling a flash tank to one or more refrigeration cases, the flash tank configured to house a first refrigerant;
coupling one or more solenoid valves to the flash tank,
coupling a first heat exchanger to the one or more solenoid valves, the one or more solenoid valves are configured to reduce a pressure of the first refrigerant flowing from the flash tank to the first heat exchanger, the first heat exchanger configured to:
receive an amount of the first refrigerant from the one or more solenoid valves;
receive a second refrigerant, the second refrigerant associated with an air conditioning load;
provide cooling to the second refrigerant, using the first refrigerant; and
coupling a check valve to the flash tank, the check valve configured to reduce a pressure of the first refrigerant flowing from the flash tank away from the one or more solenoid valves;
coupling a temperature probe to a refrigerant line exiting the first heat exchanger, the temperature probe configured to determine the temperature of the first refrigerant in the refrigerant line exiting the first heat exchanger;
coupling a controller to the temperature probe and the one or more solenoid valves, the controller configured to:
determine a temperature of the first refrigerant in the refrigerant line exiting the heat exchanger;
based on the temperature of the first refrigerant in the refrigerant line exiting the heat exchanger, determine a number of the one or more solenoid valves to open; and
instruct the number of the one or more solenoid valves to open.

8. The method of claim 7, further comprising:
coupling a gas cooler to the flash tank, the gas cooler configured to cool the first refrigerant to a first temperature; and
coupling a high pressure expansion valve to the gas cooler, the high pressure expansion valve configured to reduce a pressure of the first refrigerant flowing from the gas cooler to the flash tank.

9. The method of claim 7, further comprising coupling a compressor to the first heat exchanger; the compressor configured to:
receive the first refrigerant from the check valve and the first heat exchanger;
compress the first refrigerant; and
provide the first refrigerant to a gas cooler, the gas cooler configured to cool the first refrigerant.

10. The method of claim 7, further comprising:
coupling a low temperature compressor to a low temperature refrigeration case, the low temperature compressor configured to compress the first refrigerant from the low temperature refrigeration case;
coupling a medium temperature compressor to a medium temperature refrigeration case and the low temperature compressor, the medium temperature compressor configured to compress the first refrigerant from the medium temperature refrigeration case and the first refrigerant from the low temperature compressor;
coupling a compressor to the first heat exchanger, the compressor configured to compress the first refrigerant from the first heat exchanger; and
coupling a three-way valve to the low temperature compressor, the medium temperature compressor, and the parallel compressor, the three-way valve configured to:
direct a first amount of the first refrigerant from the low temperature compressor to the medium temperature compressor; and
direct a second amount of the first refrigerant from the low temperature compressor to the parallel compressor.

11. The method of claim 7, further comprising:
coupling a low temperature refrigeration case to the flash tank, the low temperature refrigeration case being cooled by the first refrigerant from the flash tank;
coupling a medium temperature refrigeration case to the flash tank, the medium temperature case being cooled by the first refrigerant from the flash tank;
coupling a low temperature compressor to the low temperature refrigeration case, the low temperature compressor configured to compress the first refrigerant from the low temperature refrigeration case; and
coupling a medium temperature compressor to the medium temperature refrigeration case and the low temperature compressor, the medium temperature compressor configured to compress the first refrigerant from the medium temperature refrigeration case and the first refrigerant from the low temperature compressor.

12. The method of claim 7, wherein the first refrigerant comprises a carbon dioxide (CO2) refrigerant.

13. A system, comprising:
one or more solenoid valves;
a first heat exchanger coupled to the one or more solenoid valves, the one or more solenoid valves configured to reduce a pressure of a first refrigerant flowing to the first heat exchanger;
a temperature probe coupled to a refrigerant line exiting the first heat exchanger, the temperature probe configured to determine the temperature of the first refrigerant in the refrigerant line exiting the first heat exchanger;
a controller coupled to the temperature probe and the one or more solenoid valves, the controller configured to:
determine a temperature of the first refrigerant in the refrigerant line exiting the first heat exchanger;
based on the temperature of the first refrigerant in the refrigerant line exiting the first heat exchanger, determine a number of the one or more solenoid valves to open; and
instruct the number of the one or more solenoid valves to open; and
wherein the first heat exchanger is configured to:
receive an amount of the first refrigerant from the one or more solenoid valves;
receive a second refrigerant, the second refrigerant associated with an air conditioning load; and
provide cooling to the second refrigerant, using the first refrigerant.

14. The system of claim 13, further comprising a check valve coupled to a flash tank, the check valve configured to reduce a pressure of the first refrigerant flowing from the flash tank away from the one or more solenoid valves.

15. The system of claim 13, further comprising:
a gas cooler configured to cool the first refrigerant to a first temperature; and
a high pressure expansion valve coupled to the gas cooler, the high pressure expansion valve configured to reduce a pressure of the first refrigerant flowing from the gas cooler to a flash tank.

16. The system of claim 13, further comprising, a parallel compressor coupled to the first heat exchanger, the parallel compressor configured to:
receive the first refrigerant from the check valve and the first heat exchanger;
compress the first refrigerant; and
provide the first refrigerant to a gas cooler, the gas cooler configured to cool the first refrigerant.

17. The system of claim 13, further comprising:
a low temperature compressor coupled to a low temperature refrigeration case, the low temperature compressor configured to compress the first refrigerant from the low temperature refrigeration case;
a medium temperature compressor coupled to a medium temperature refrigeration case and the low temperature compressor, the medium temperature compressor configured to compress the first refrigerant from the medium temperature refrigeration case and the first refrigerant from the low temperature compressor;
a parallel compressor coupled to the first heat exchanger, the parallel compressor configured to compress the first refrigerant from the first heat exchanger; and
a three-way valve coupled to the low temperature compressor, the medium temperature compressor, and the parallel compressor, the three-way valve configured to:
direct a first amount of the first refrigerant from the low temperature compressor to the medium temperature compressor; and
direct a second amount of the first refrigerant from the low temperature compressor to the parallel compressor.

18. The system of claim 13, wherein the first refrigerant comprises a carbon dioxide (CO2) refrigerant.

* * * * *

UNITED STATES PATENT AND TRADEMARK OFFICE
CERTIFICATE OF CORRECTION

PATENT NO. : 10,365,023 B2
APPLICATION NO. : 15/696755
DATED : July 30, 2019
INVENTOR(S) : Shitong Zha et al.

It is certified that error appears in the above-identified patent and that said Letters Patent is hereby corrected as shown below:

In the Claims

In Column 17, Line 10, after "medium temperature refrigeration..." please delete "vase" and insert -- case --, therefor.

In Column 17, Line 18, after the word "direct" and before "first amount" please insert -- a --, therefor.

In Column 17, Line 26, after "tank," please delete "to" and insert -- the --, therefor.

In Column 20, Line 5, after "The system of claim 13," please delete "further comprising, a parallel" and insert -- further comprising a parallel --, therefor.

Signed and Sealed this
Third Day of May, 2022

Katherine Kelly Vidal
Director of the United States Patent and Trademark Office